H. C. GAMMETER.
FLYING MACHINE.
APPLICATION FILED OCT. 9, 1907.
968,931.
Patented Aug. 30, 1910.
6 SHEETS—SHEET 5.
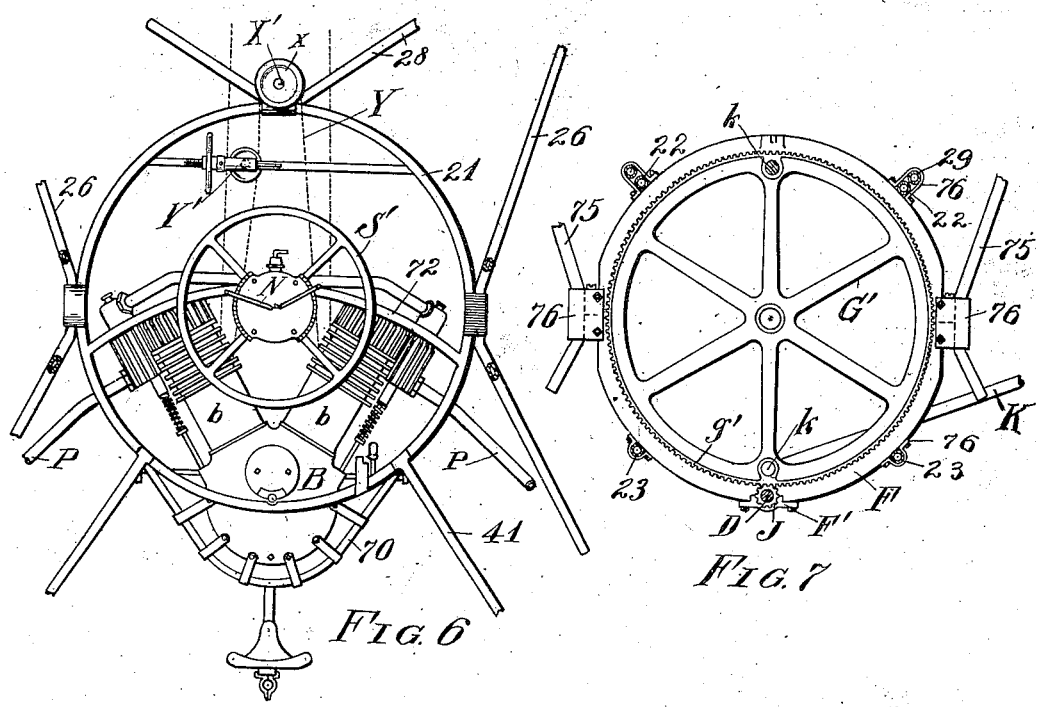
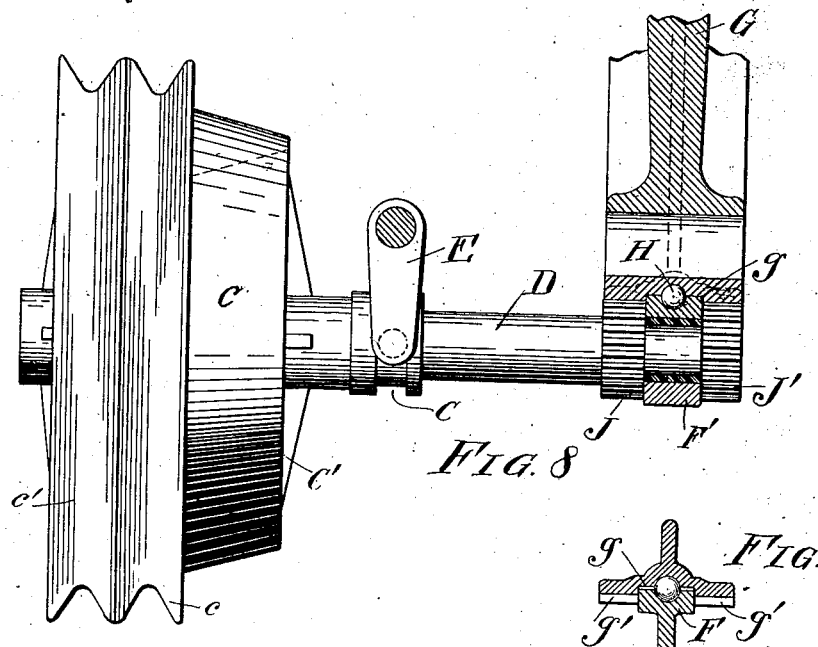
WITNESSES:
INVENTOR,
Harry C. Gammeter
BY Baker, Fouts & Hill
ATTYS.

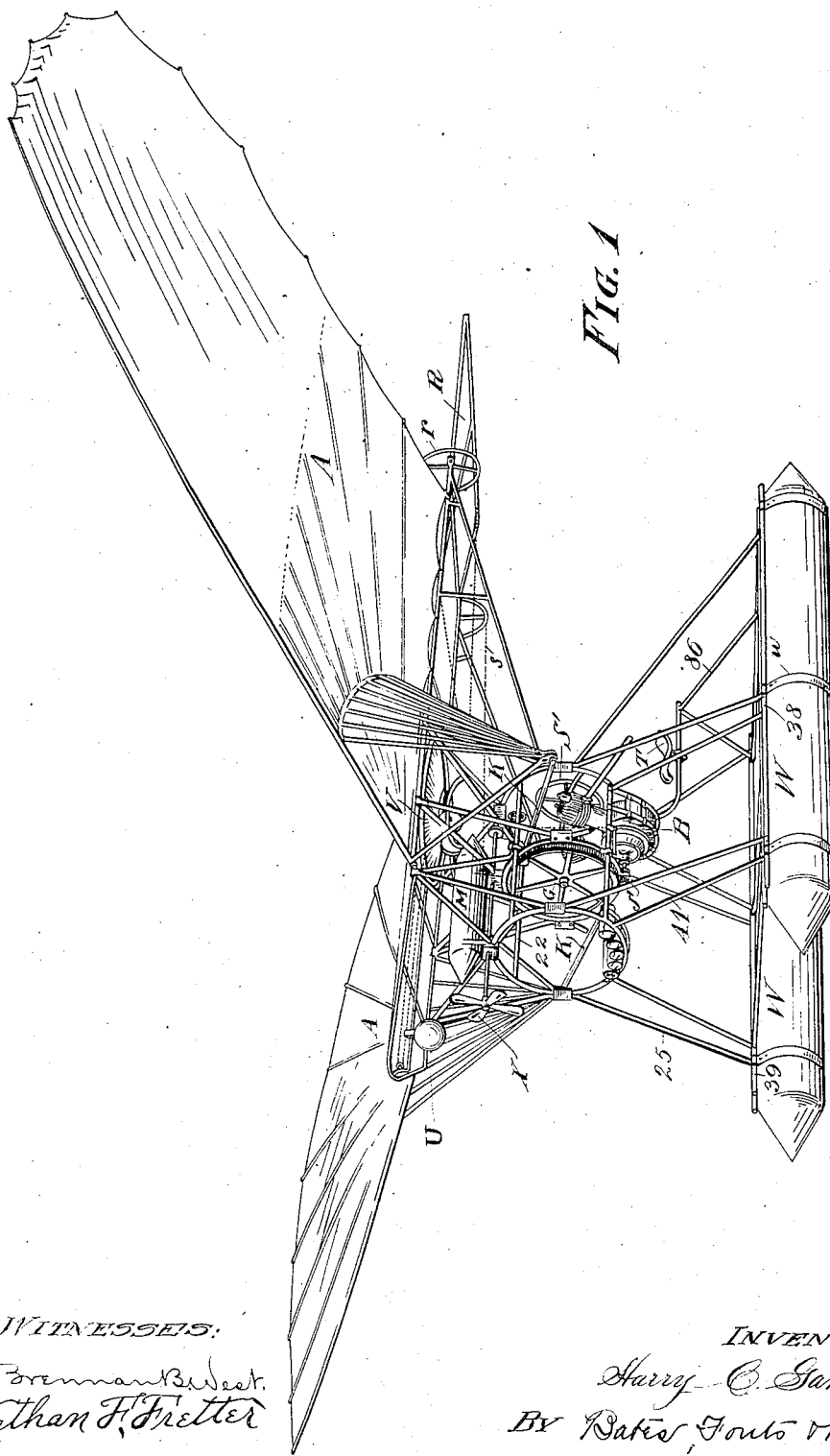

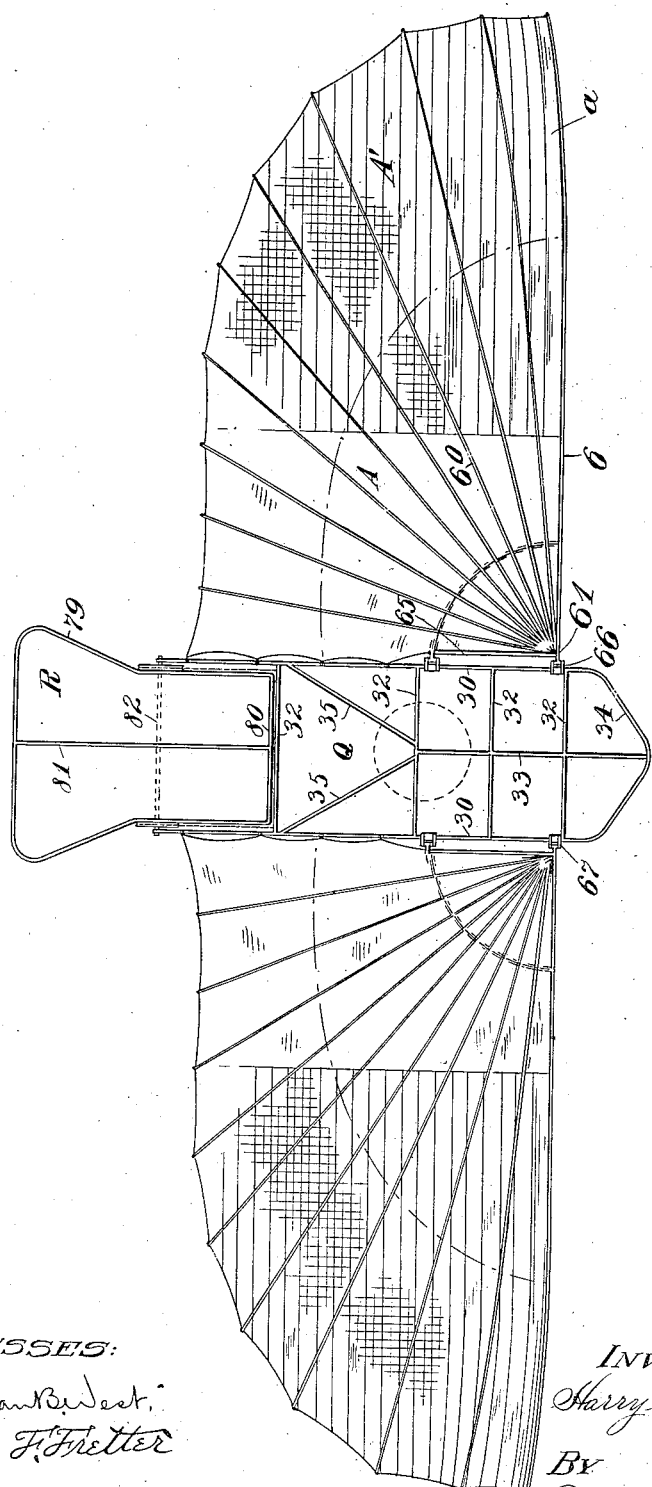

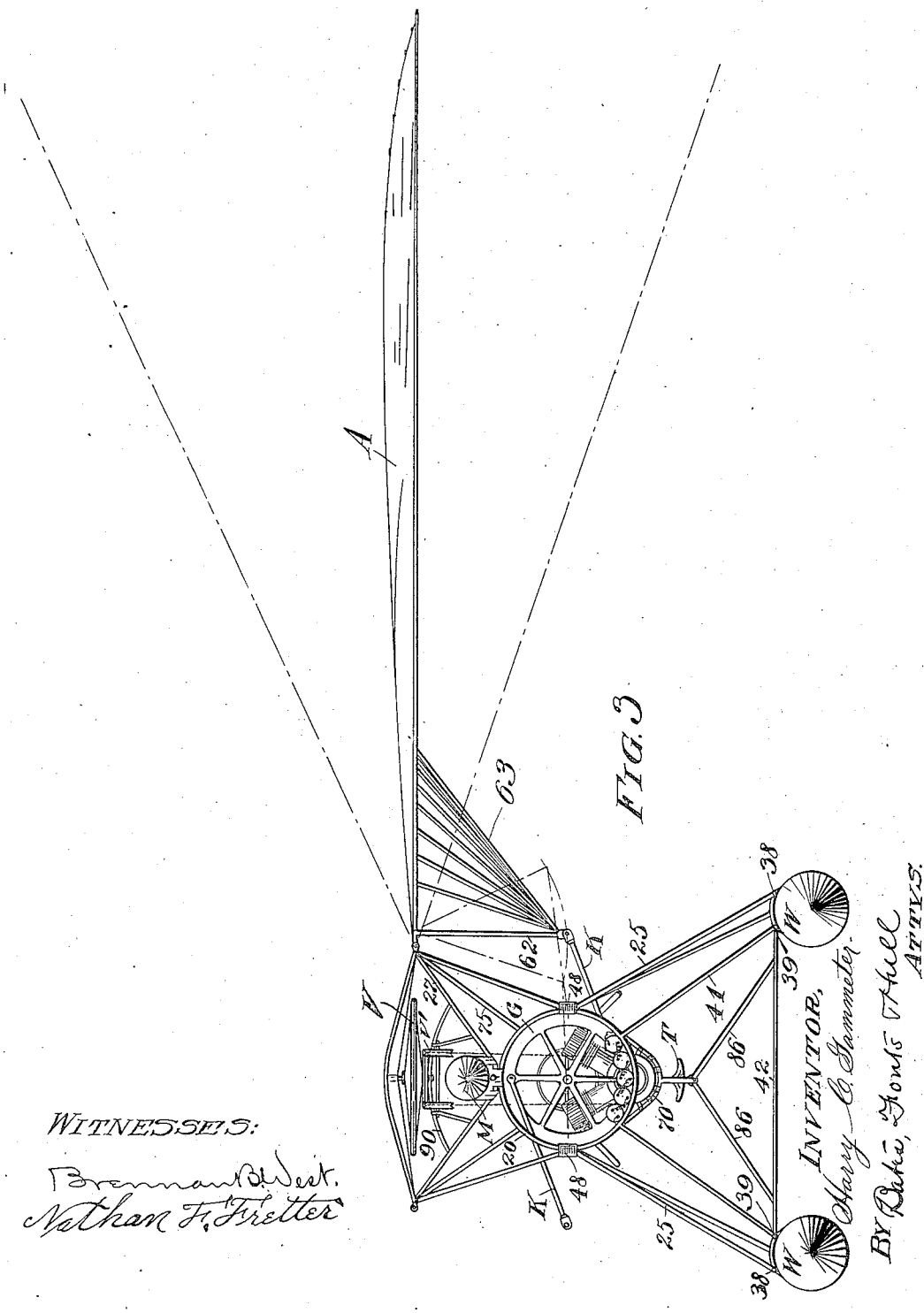

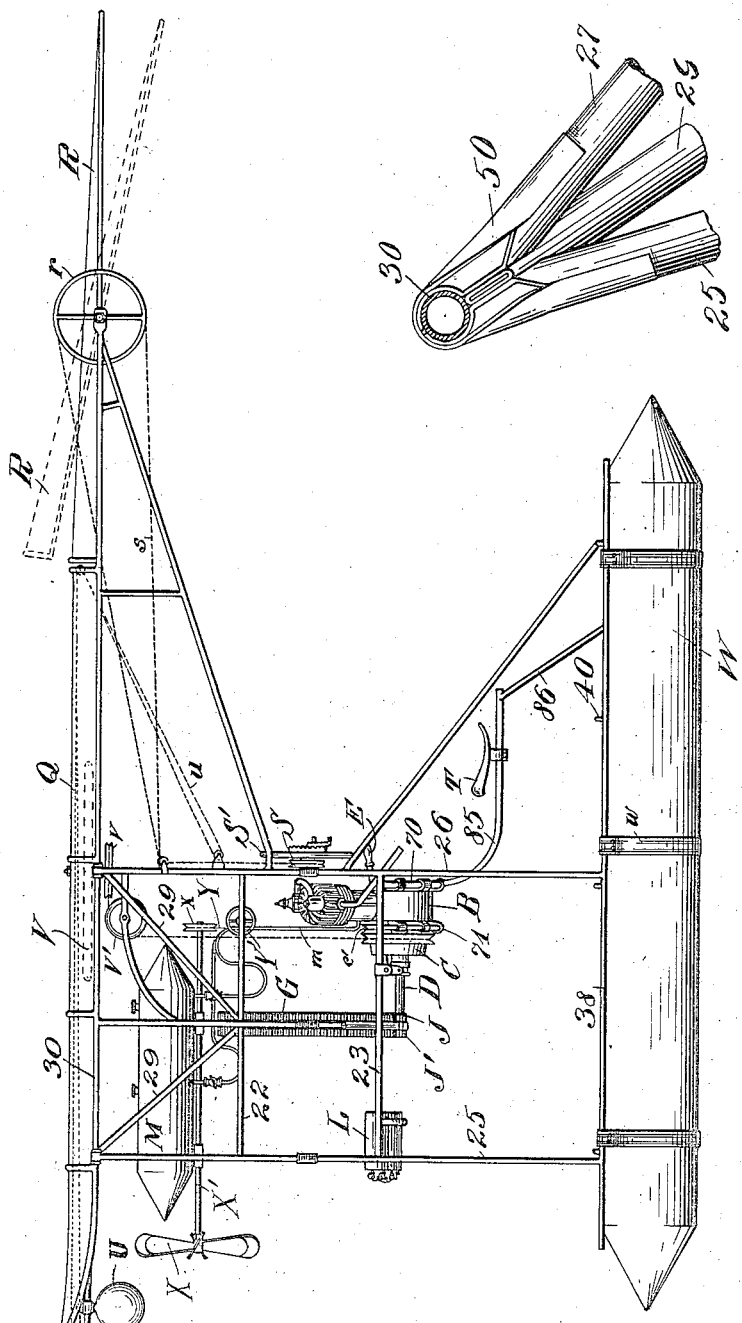

H. C. GAMMETER.
FLYING MACHINE.
APPLICATION FILED OCT. 9, 1907.

968,931.

Patented Aug. 30, 1910.
6 SHEETS—SHEET 6.

WITNESSES:
Brennan B. West.
Nathan F. Fretter

INVENTOR,
Harry C. Gammeter
By Bates Fouts & Hull,
ATTYS.

UNITED STATES PATENT OFFICE.

HARRY C. GAMMETER, OF COLLINWOOD, OHIO.

FLYING-MACHINE.

968,931.

Specification of Letters Patent. Patented Aug. 30, 1910.

Application filed October 9, 1907. Serial No. 396,546.

*To all whom it may concern:*

Be it known that I, HARRY C. GAMMETER, a citizen of the United States, residing at Collinwood, in the county of Cuyahoga and State of Ohio, have invented a certain new and useful Improvement in Flying-Machines, of which the following is a full, clear, and exact description, reference being had to the accompanying drawings.

The object of this invention is to provide an effective flying machine operating with wings on the principle of a bird and so arranged as to have little weight and great power in proportion to the area of wing surface.

The invention includes the broad idea of valved wings mechanically driven up and down, as well as various features contributing to the efficiency of the machine; its control, its rigidity and lightness, the driving mechanism, the steadying device, etc.

The invention may accordingly be most conveniently summarized as comprising the machine and parts thereof hereinafter explained and set out in the essential characteristics in the claims.

The drawings fully disclose my invention in an approved form, these drawings having been made from an actual machine.

Figure 11:
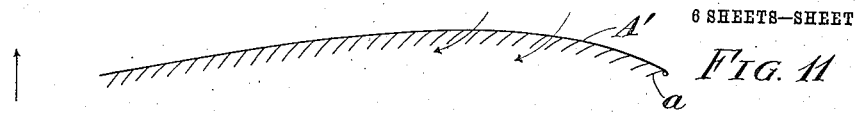
Figure 12:
Figure 10:
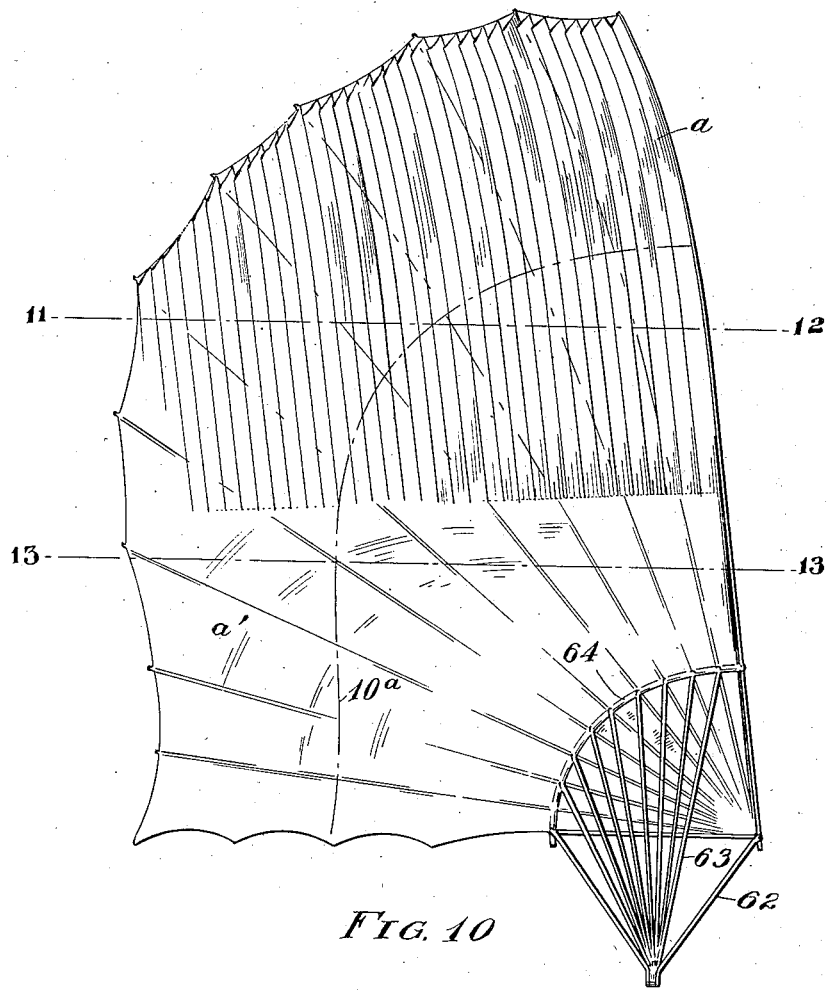
Figure 13:
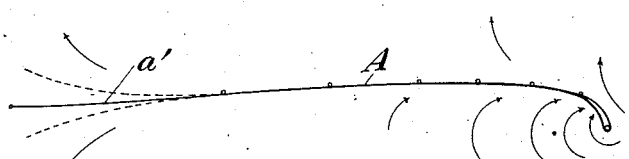

Figure 1 is a perspective view of the machine complete; Fig. 2 is a plan thereof; Fig. 3 is a front elevation with one wing omitted; Fig. 4 is a side elevation with one wing omitted; Fig. 5 is a detail showing the junction of several frame bars; Fig. 6 is a rear elevation of the engine and its support; Fig. 7 is a face view of the main drive gear with the driving pinion, being in a plane parallel with Fig. 6 and forward thereof; Fig. 8 is a side elevation on an enlarged scale of the controlling clutch, driving pinion and bearing therefor; Fig. 9 is a detail showing, in section, the main gear and its bearing; Fig. 10 is a perspective of the wing looking from its underside; Fig. 11 is a cross section of the wing with the valves open, being in the position they have as the wing is elevated, and Fig. 12 is a cross section of the same portion of the wing when being moved downward, these two cross sections being taken on the line 11—12 of Fig. 12; Fig. 13 is a cross section of the wing on the line 13—13 of Fig. 10, the flection of the wing being indicated by the dotted lines and the air currents by arrows.

The frame of the machine is made of bars preferably composed of very light steel tubing brazed or otherwise secured together. As shown, these tubes form a skeleton drum to carry the driving mechanism, upwardly and outwardly projecting skeleton arms to carry the wing pivots, and downwardly and outwardly projecting skeleton arms carrying the base of the machine. The drum referred to in the embodiment shown comprises two circular rings of tubing 20 and 21 standing vertically and braced by horizontal bars of which four may be used, for example, two appearing in Fig. 4 at 22 and 23. Secured to the outer periphery of the respective rings are the bars 25 and 26, these bars bending outwardly both above and below their contact with the rings. Secured to the highest point of their respective rings are bars 27 and 28, bent upward at each side of their point of connection with the ring and having their ends meeting the upward ends of the bars 25 and 26 respectively.

Suitable diagonal bars 29 lead from the junctions of the bars 25 and 27 and the bars 26 and 28 downwardly to a point of connection with the cross bars 22. This arrangement provides four upwardly and outwardly projecting skeleton arms. The two arms on either side carry a fore-and-aft bar 30, these two bars 30 forming a pivotal support for the wings. The bars 30 are transversely braced by cross bars 32, an intermediate longitudinal bar 33, a front bar 34 and diagonal bars 35. These last mentioned bars, with the longitudinal bars 30, form what may be called the skeleton of the roof of the machine.

The bars 25 and 26 lead downward to longitudinal bars 38 to which are secured, by cross bars 40, the parallel bars 39. From the bars 39 diagonal bars 41 lead upwardly to the rings 20 and 21. Suitable cross bars 42 are also provided between the two bars 39. This construction makes an effective and rigid base or support on which the machine may rest when not flying.

It will be seen that the above frame, while being of a skeleton nature, is designed to be very strong and well braced. It is particularly light, the various bars referred to being of metal tubing, as, for example, hard drawn seamless tubing.

The frame members are in some instances brazed to each other; in others secured by metal clasping strips, as shown in Fig. 5. Fig. 5 may be considered as an enlarged view of the upper left hand corner of the frame shown in Fig. 4. The bars 25 and 27 are flattened on their adjacent sides and are cut to each lap substantially half way around the longitudinal bar 30. The bar 29 is flattened and passes between the two bars 25 and 27 and a strap 50 is secured to the outer side of bars 25 and 27 and passes around the bar 30. This construction is then brazed together.

The wings, are pivotally connected to the two bars 30 and extend outward therefrom in opposite directions. The frame of each wing consists of a number of bars 60 radiating from a common point at 61 at the front inner corner of the wing. At this point there extends downwardly the bar 62 and from the lower end of this bar brace bars 63 extend upward to points beneath the various ribs 60, the upper ends of the brace bars 63 being secured to an arc-shaped bar 64 to which the ribs are secured. These brace bars form substantially a quarter of a skeleton cone. 65 designates a short horizontal bar running between the upper end of the bar 62 and the farthermost brace bar 63. The two ends of the bar 65 carry hinge eyes 66 which surround bearing sleeves 67 on the bars 30 and form the main hinges for the wings. The wing frames carry a textile covering to be hereinafter more fully explained. Its inner portion is shown at A in Fig. 2, being tied to the longitudinal bars 30 at the rear of the hinges.

The driving mechanism is carried by the skeleton drum referred to and is connected with the lower end of the wing bars 62 for the purpose of swinging the wings up and down on their hinges. This driving mechanism, as shown, comprises an explosive engine and suitable gearing especially devised for this machine and forming one of the novel features claimed.

The engine is designated B. It is a gasolene explosive engine of a usual type. In the form shown there are two cylinders $b$ at an angle to each other, and their pistons (not shown) drive a crank in a crank chamber. The engine is supported by straps on suitable depending frame bars 70 and 71 and braced by a suitable cross bar 72 extending across the ring 21. The crank shaft of this engine is keyed to the member C of a clutch (Figs. 4 and 8). The other or movable member of this clutch C' is splined on a shaft D alining with the crank shaft. When the clutch members are in engagement, as shown in Figs. 4 and 8, the engine drives the shaft D. To throw the clutch out of engagement I provide a bell crank E pivotally supported by one of the bars 23. The longer arm of this bell crank forms an operating hand lever and the short arm engages in a collar $c'$ on the clutch member C'.

The driven shaft D has its outer bearing in the lower edge of a metal ring F secured to frame bars 22 and 23 and also to the bars 75 which extend from the bars 30 to the bars 23. This securement is accomplished by suitable clips or shackles, shown in Fig. 7 at 76 and 77 respectively. Beneath the seat of the shaft D in the ring F is a bearing cap F'. Within the ring F is mounted a main driving gear G. This gear has a groove $g$ seating over the ring, and in the proximate faces of the ring and groove is an annular ball race-way in which roll a complete circle of balls H. This makes a very simple and effective ball bearing for the gear G. The ring F is made in two halves separable at the clips 76 to allow the assemblage of these parts. The gear G is provided with a double set of gear teeth $g'$ on opposite sides of the groove $g$. Mounted on the shaft D are two pinions J J' which mesh with the teeth of the gear. The gear is connected with the wings by two pitmen K connected at their outer ends to the lower ends of the wing bars 62 and at their inner ends by journal pins $k$ with the gear G. These two journal pins are at diametrically opposite points and are also located on opposite faces of the gear. This construction makes an extremely simple and a well-balanced drive.

The engine is sparked by a current from a suitable battery indicated by L; it receives its gasolene and lubricating oil from compartments in a tank M through tubes $m$, and it has suitable levers N to regulate the mixture and the sparking. The engine is provided with exhaust pipes P which are shown as discharging rearwardly on each side of the ring 21.

It will be seen that the above described mechanism is able to give a very powerful drive. At the same time the extremely rapid rotations of the shaft give oscillations to the wings with ample rapidity. The engine in the machine shown gives a power in proportion to wing surface quite in excess of the strongest bird, according to the most reliable data available.

The wings are specially designed, not only to cause the machine to lift as the wings oscillate up and down but to cause it to move forward. To effect this result, the wings have several peculiar characteristics which will now be described. The textile covering of the wing is of light material as silk. The portion A adjacent to the hinge and extending outwardly a considerable distance therefrom is uninterrupted, while the outermost portion A' of the wing consists of individual longitudinal strips *a* which are sewed at their upper edges to a netting extending over this portion of the wing. These strips constitute valves which are adapted to allow air to pass downwardly through the wing but not upwardly, as illustrated in Figs. 11 and 12, 11 representing the condition of the wing when rising and 12 its condition when moving downward.

The valves in the wings constitute the key to the problem of flying, for they allow the wings to move upward freely through the air while giving the wing a hold on the air on the downward stroke. Moreover, these valves incline rearwardly so that the air passes diagonally through the wing on the upward stroke, as indicated by the arrows in Fig. 11, and this helps propel the machine forward. This upward stroke of the wing leaves rarefied air on its underside acting against the downwardly bent front edge of the wing, as shown by the arrows in Fig. 13. Near its rear and outer edges the wing is flexible so that it bends downward on the upper stroke, as shown in dotted lines in Fig. 13, preventing rarefaction of air at the rear edge which would counteract the forward effect.

On the downward stroke the wing not only raises the machine but propels it forward by reason of the rear part of the wing bending upward, as shown in dotted lines in Fig. 13, which position of the wing shoves the air rearward and hence the machine forward. The flexure of the outer and rear portion of the wing results from their being no stiff support from these edges and from the ribs becoming thinner at such points. The approximate line of flexure of the wing is indicated in Figs. 2 and 10 by the broken line 10$^a$.

Another means for causing the forward movement of the machine as it rises and falls due to the wing movement, is the inclination rudder R which is composed of metallic frame bars 79, 80, 81 mounted on a horizontal bar 82 which is journaled in the rear end of the frame bars 30, this frame being covered with cloth. The front cross bar 80 of the rudder frame is arched to make the rudder at this end adapted to aline with the roof portion Q in front thereof. The rudder is operated by means of sheaves *r* on the shaft 82 from which run cords *s* to a driving pulley S rigid with which is the hand wheel S'. This hand wheel is adapted to swing the rudder as desired and may cause it to act as a brake by turning it into substantially vertical position.

I provide an adjustable seat T for the rider, the same being shown as a saddle mounted on a frame bar 85 leading downward and rearward from the bar 70. At its rear end this frame bar is supported by diagonal bars 86, leading to one of the cross bars 42. This seat T allows the operator to have before him, in convenient position, the levers N for controlling the engine, the lever E for controlling the clutch and the hand wheel S' for operating the inclination rudder. The machine is steered by means of the operator leaning in one direction or the other, his weight slightly tipping the machine so that in its flight it curves in that direction. The saddle is adjustable longitudinally according to the weight of the operator. This weight may also be variably counter-balanced, as air currents are engaged, by the shifting of a counter-weight U, which is slidable on a longitudinal central frame bar 89, by means of an endless cord *u* which passes forward and rearward over pulleys and downward into position where it may be easily grasped by the operator.

To provide simple and effective means for steadying the machine, I mount within the hood Q a horizontal fly-wheel V which is weighted at its periphery and is rapidly rotated by the engine. This fly-wheel acting according to the principle of a gyroscope, prevents the machine from unduly tipping and gives it a tendency to right itself. The wheel V is supported below by an arched frame bar 90, carried by the bar 27, and above by one of the bars 32 of the hood. It is driven by a suitable belt $v'$ passing from the sheave *c* on the constantly driven clutch member C upward across guide sheaves V' and onto a sheave *v* rigid with the wheel V. The wheel is suitably incased by a fabric casing (omitted for clearness of illustration) to prevent its disturbing the air beneath the wings.

To provide a convenient cushion for the machine to rest upon when standing, as well as a float to support it upon water, I provide the two longitudinal air tanks W which are preferably made of rubber or other material adapted to hold the air. Each of these tanks lies below the two longitudinal bars 38 and 39 and is secured thereto by straps *w*.

To enable propulsion of the machine more rapidly than may be caused by the wings alone, as well as to provide for its forward movement when the wings are held stationary and act as supporters, I have a propeller driven by the same engine which moves the wings. This propeller is omitted in Fig. 3, for clearness, but in Figs. 1 and 6 is shown at X on the forward end of a shaft X' mounted in the central plane of the machine and supported in a suitable piece above the bar 28 and ring 21. At its rear this shaft carries a pulley *x* on which runs a belt Y from a sheave $c'$ on the continuously driven clutch member C. A belt tightener Y' (operated by a hand wheel on a threaded bar) controls this belt and determines whether it drives the propeller or slips idly on its pulley. Thus the wings and propeller may operate simultaneously or independently, as desired.

I claim:

1. In a flying machine, a wing having a comparatively stiff forward edge, a series of parallel fabric strips secured at their upper edges and forming valves, said strips extending substantially to the outer edge of the wing, said outer edge being free from rigid restraint.

2. In a flying machine, a wing having stiff bars extending from the forward inner corner along the forward edge and along the inner edge, ribs radiating from such corner and suitable brace bars extending transversely to the wing and operating to brace said corner and said wings.

3. In a flying machine, a wing, means for hinging it along its inner edge and a series of valves in the wing extending substantially parallel with the front edge to the extreme outer end, the front edge of the wing being comparatively stiff and the outer edge being free from rigid restraint.

4. In a flying machine, a wing, means for hinging it along its inner edge and a series of valves in the wing extending substantially parallel with the front edge to the outer end, the front edge of the wing being comparatively stiff and the outer edge being free from rigid restraint, and said valves being composed of fabric strips secured at their upper edges.

5. In a flying machine, a wing having a bar along its front edge and radiating ribs, and a fabric covering, the outer and rear edges of the wing being free from rigid restraint and a series of valves formed in the wing and comprising parallel fabric strips secured near their edges and extending from intermediate points in the wing to the outer edge of the wing.

6. In a flying machine, the combination with a central frame of wings hinged to opposite sides thereof, each wing being slightly dish-shaped on its under side and having a series of parallel fabric strips secured at their upper edges and forming valves to allow air to pass relatively downward and rearward.

7. In a flying machine, the combination with a frame, of a wing hinged thereto and having ribs radiating from a point adjacent to the forward inner corner, a bar depending from said corner, braces leading from said bar near its lower end to points adjacent to the various ribs, and means acting on the lower end of said bar to oscillate the wing.

8. In a flying machine, the combination with a frame, of a wing having ribs radiating from a point adjacent to the forward inner corner, a bar in the wing leading rearward from said corner parallel with said frame and hinged thereto, a bar depending from said corner, braces connecting said depending bar with the ribs and bar first mentioned, and means acting on said depending bar to oscillate the wing.

9. The combination of a frame, wings hinged thereto, a rotatable wheel carried by the frame, a pair of pitmen connected with opposite sides of the wheel at their inner ends and connected at their outer ends with said wings.

10. The combination of a central frame, wings hinged to opposite sides thereof, a rotatable wheel carried by the frame, a pair of pitmen connected with diametrically opposite points of the wheel at their inner ends and connected at their outer ends with said wings.

11. In a flying machine, the combination of a central frame, a pair of wings hinged to the opposite upper corners thereof, bars depending from said wings, a wheel carried by the central frame, and pitmen connected to diametrically opposite portions of the wheel at their inner ends, and at their outer ends to the bars depending from the wings.

12. In a flying machine, the combination of a central frame, a pair of wings hinged to the opposite upper corners thereof, a wheel carried by the central frame, and pitmen connected at their inner ends to diametrically opposite portions of the wheel on opposite faces thereof, and at their outer ends to members depending from the wings.

13. In a flying machine, the combination of a wing, a stationary ring, a wheel mounted within the ring with intermediate balls between them, means for rotating the wheel, and means connecting the wheel with the wing.

14. In a flying machine, the combination of a frame, wings hinged to the opposite sides thereof, a stationary ring, a wheel mounted within the ring with intermediate balls between them, means for rotating the wheel, and means connecting the wheel with both wings.

15. In a flying machine, the combination of a frame, wings hinged thereto, a ring rigidly carried by the frame, a rotatable wheel within the ring, a row of balls between the wheel and ring, means for driving the wheel, and pitmen connecting opposite points on the wheel with the wings.

16. In a flying machine, the combination of a frame, wings hinged thereto, a ring rigidly carried by the frame, a rotatable wheel within the ring, a row of balls between the wheel and ring, means for driving the wheel, and pitmen on opposite faces of the wheel and connecting the same with the wings.

17. In a flying machine, the combination with a frame, and wings carried thereby, of a ring carried by the frame, a wheel journaled within said ring, and having gear teeth on opposite sides of the ring, a double pinion for driving this double toothed gear, and connecting mechanism between said gear and the wings.

18. In a flying machine, the combination of a central frame having skeleton arms extending diagonally upward, wings hinged at the apex of such arms and means for driving the wings.

19. In a flying machine, the combination of a central frame having skeleton arms extending diagonally upward and diagonally downward, wings hinged at the apex of the upper arms, and a base at the foot of the lower arms.

20. In a flying machine, the combination of a central frame having skeleton arms extending diagonally upward and diagonally downward, wings hinged at the apex of the upper arms, means carried by the frame for driving the wings, and a suitable base at the lower end of the lower arms.

21. In a flying machine, the combination of a central frame having skeleton arms extending diagonally upward, wings hinged at the apex of such arms, means mounted on the frame for driving the wings, and connections between said means and the under sides of the wings.

22. In a flying machine, the combination of a central frame comprising a skeleton drum and bars connected therewith, and wings hinged to said bars.

23. In a flying machine, the combination of a central frame comprising a skeleton drum and bars connected therewith and forming upwardly projecting arms, and wings hinged to the upper ends of said arms.

24. In a flying machine, the combination of a frame composed of hollow tubular members secured together to make a central portion with projecting arms having separated ends, a cross member between said ends, and wings hinged to said arms.

25. In a flying machine, the combination of a frame having a central portion with skeleton arms extending therefrom to make approximately a four point star in front elevation, wings hinged to the upper points of the star, and a base carried by the lower points of the star.

26. In a flying machine, the combination of a frame having a central skeleton drum made of tubular members, tubular arms extending therefrom to make approximately a four point star in front elevation, wings hinged to the upper points of the star, and a base carried by the lower points of the star.

27. In a flying machine, the combination of a frame comprising a central skeleton drum and hollow bars connected therewith and extending diagonally upward in two arms, a pair of wings hinged to the upper points of said arms respectively, driving mechanism carried by said skeleton drum, and mechanism connecting the same with said wings.

28. In a flying machine, the combination of a frame comprising a central skeleton drum composed of vertical rings and horizontal bars, hollow bars connected with said rings and extending diagonally upward and outward to an apex, a pair of wings hinged at such apex, driving mechanism carried by said skeleton drum, and mechanism connecting the same with said wings.

29. In a flying machine, the combination of a frame comprising a central skeleton drum and hollow bars connected therewith and extending diagonally upward in two arms, a pair of wings hinged to the upper points of said arms respectively, driving mechanism carried by said skeleton drum, said wings having members depending from their under sides, and connecting mechanism between said members and the driving mechanism enabling the driving mechanism to oscillate the wings.

30. A frame having tubular bars, two of such bars being formed to meet and pass partly around the surface of the third bar, such three parts being secured together.

31. A frame having tubular bars, two of such bars being formed to meet and pass partly around the surface of a third bar, and a fourth bar flattened and extending between the two bars first mentioned.

32. In a flying machine, the combination of a central frame comprising a skeleton drum, arms secured to said drum, said arms converging toward an apex and secured together at such point, a wing hinged to the apex of said arms, and means for operating the wing.

33. In a flying machine, the combination of a central frame comprising a skeleton drum, arms secured to said drum on opposite sides thereof, each set of said arms converging toward an apex and joined together at said apex, wings pivotally secured to the said arms at the apex, and means for operating the wings.

34. In a flying machine, the combination of a central frame comprising a skeleton drum, diagonal arms secured to said skeleton drum, members secured to the outer ends of said arms at the top and bottom, wings secured to said arms, and means for operating the wings.

35. In a flying machine, the combination of a central frame comprising a skeleton drum, parallel members above and below said drums, diagonal arms connecting the last mentioned members with the drum.

36. In a flying machine, the combination of a central frame comprising a skeleton drum, parallel members above and below said drum and extending beyond the said drum, diagonal arms connecting the last mentioned members with the drum, and brace rods secured to the drum and the rear portions of the parallel members.

37. In a flying machine, the combination of a central frame comprising a skeleton drum, parallel members above and below said drum, bars connecting the said drum and last mentioned members, a curved bar connected at one end with the drum, and diagonal bars connecting the opposite end of said bar and the lower one of the parallel bars, said curved bar supporting a seat for the operator.

38. In a flying machine, the combination of a frame, wings secured thereto, a bar secured to said wings at the inner portion thereof, a plurality of bars secured at one end to the said wings and arranged in a fan shape, the opposite ends of said bars being connected to the first mentioned bar, and means pivotally secured at such meeting point for operating the wings.

39. In a flying machine, the combination of a frame, wings secured thereto, a bar secured to said wings at the inner portion thereof, a plurality of bars secured at one end to the said wings and arranged in a fan shape, the opposite ends of said bars being connected to the first mentioned bar, a pitman pivotally secured at the point where the said bars join, and means for reciprocating said pitman.

40. In a flying machine, the combination of a central frame, a pair of wings hinged thereto, each wing having a bar along its forward edge, a bar along its hinged edge, a bar projecting substantially from the junction of said edges, another bar connecting said projected bar near its free end with the hinge bar mentioned, means for bracing the last mentioned bars, a pair of pitmen connected to the last mentioned bars of the two wings, and means for simultaneously pulling and for simultaneously pushing on the two pitmen.

41. In a flying machine, a wing having a bar extending along its forward edge, a bar along its inner edge, a bar depending from the junction of said edges, another bar depending from the inner edge and at its free end joining the depending bar first mentioned and a brace bar leading from the junction of the two depending bars to an intermediate position on the wing.

In testimony whereof, I hereunto affix my signature in the presence of two witnesses.

HARRY C. GAMMETER.

Witnesses:
 ALBERT H. BATES,
 BRENNAN B. WEST.